Oct. 23, 1962    H. L. DANIELS ETAL    3,060,409
ANALOG SYSTEM
Filed Jan. 31, 1956    7 Sheets-Sheet 1
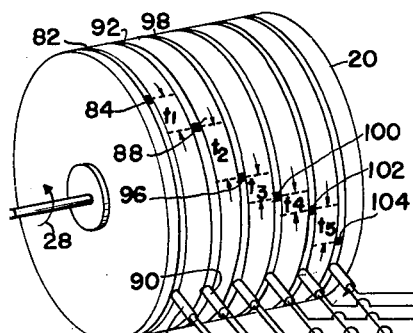
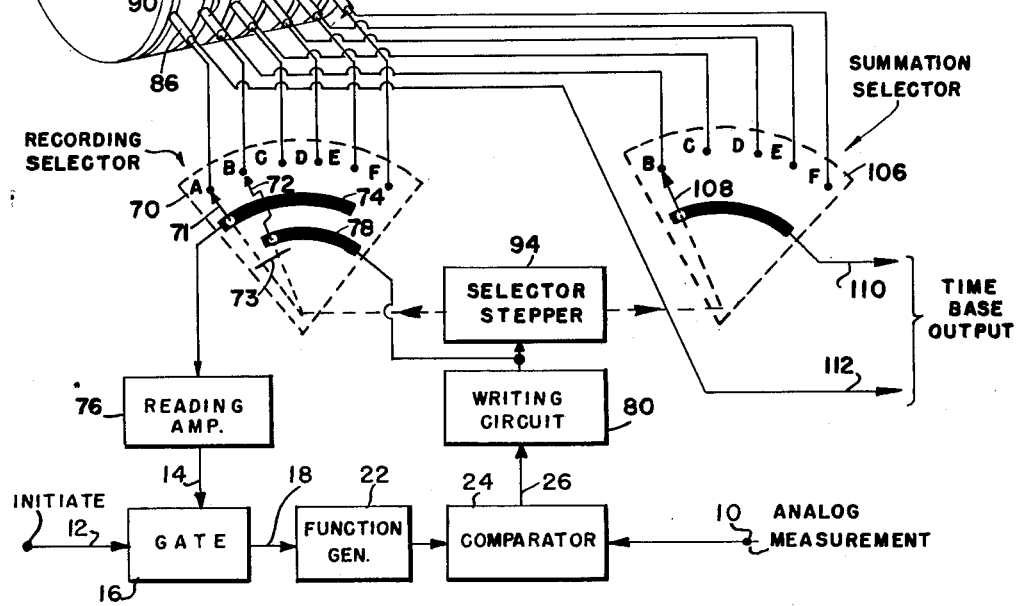
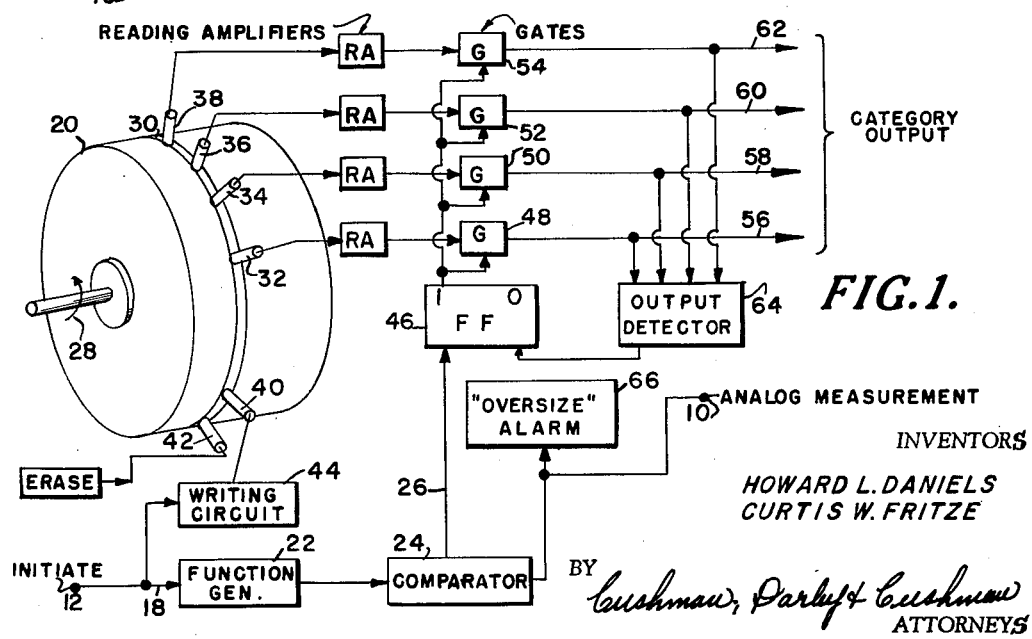
INVENTORS
HOWARD L. DANIELS
CURTIS W. FRITZE
BY Cushman, Darby & Cushman
ATTORNEYS Oct. 23, 1962 H. L. DANIELS ETAL 3,060,409
ANALOG SYSTEM
Filed Jan. 31, 1956 7 Sheets-Sheet 2
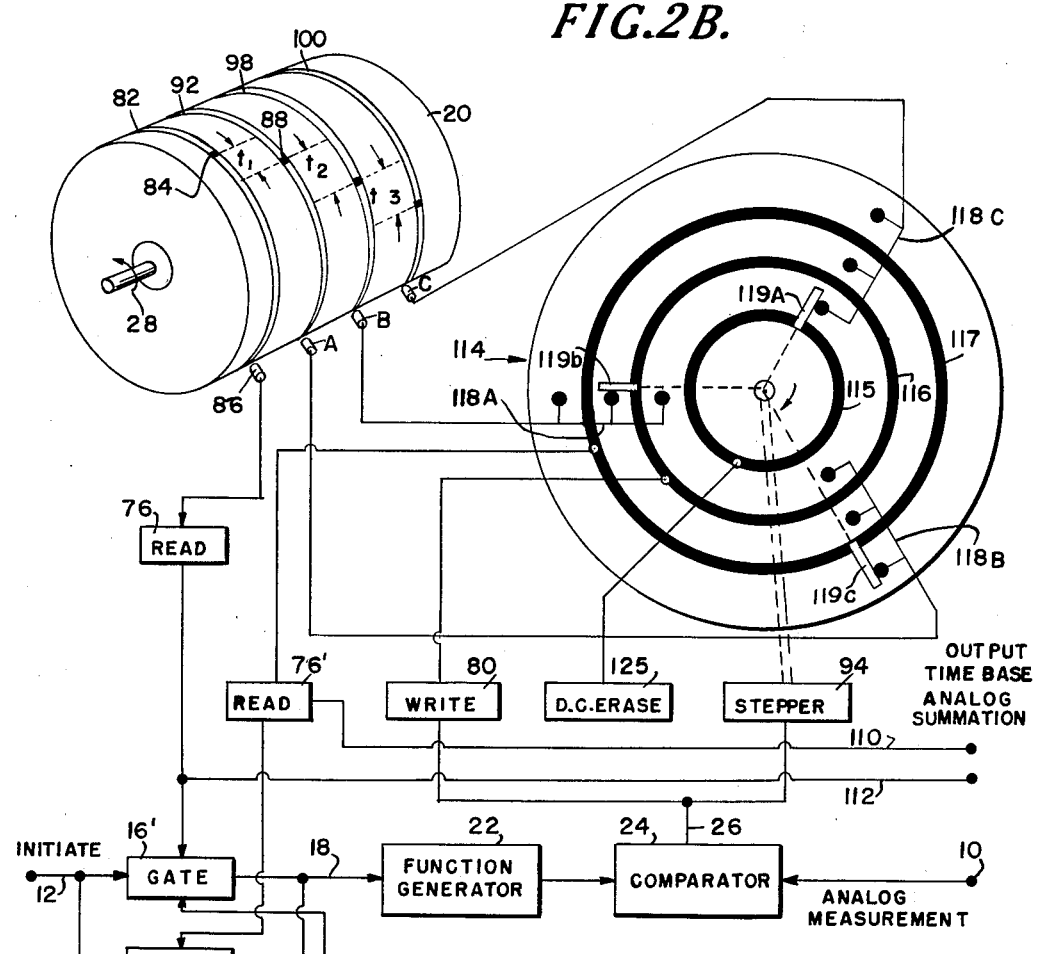
FIG. 2B.
FIG. 2A.
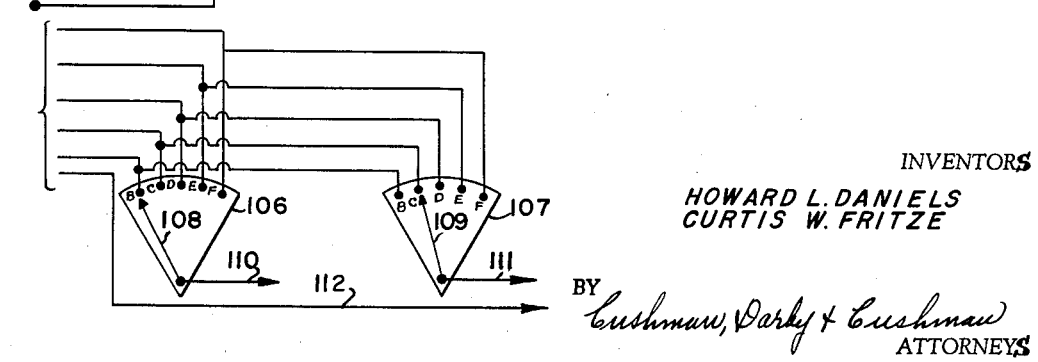
INVENTORS
HOWARD L. DANIELS
CURTIS W. FRITZE
BY Cushman, Darby & Cushman
ATTORNEYS

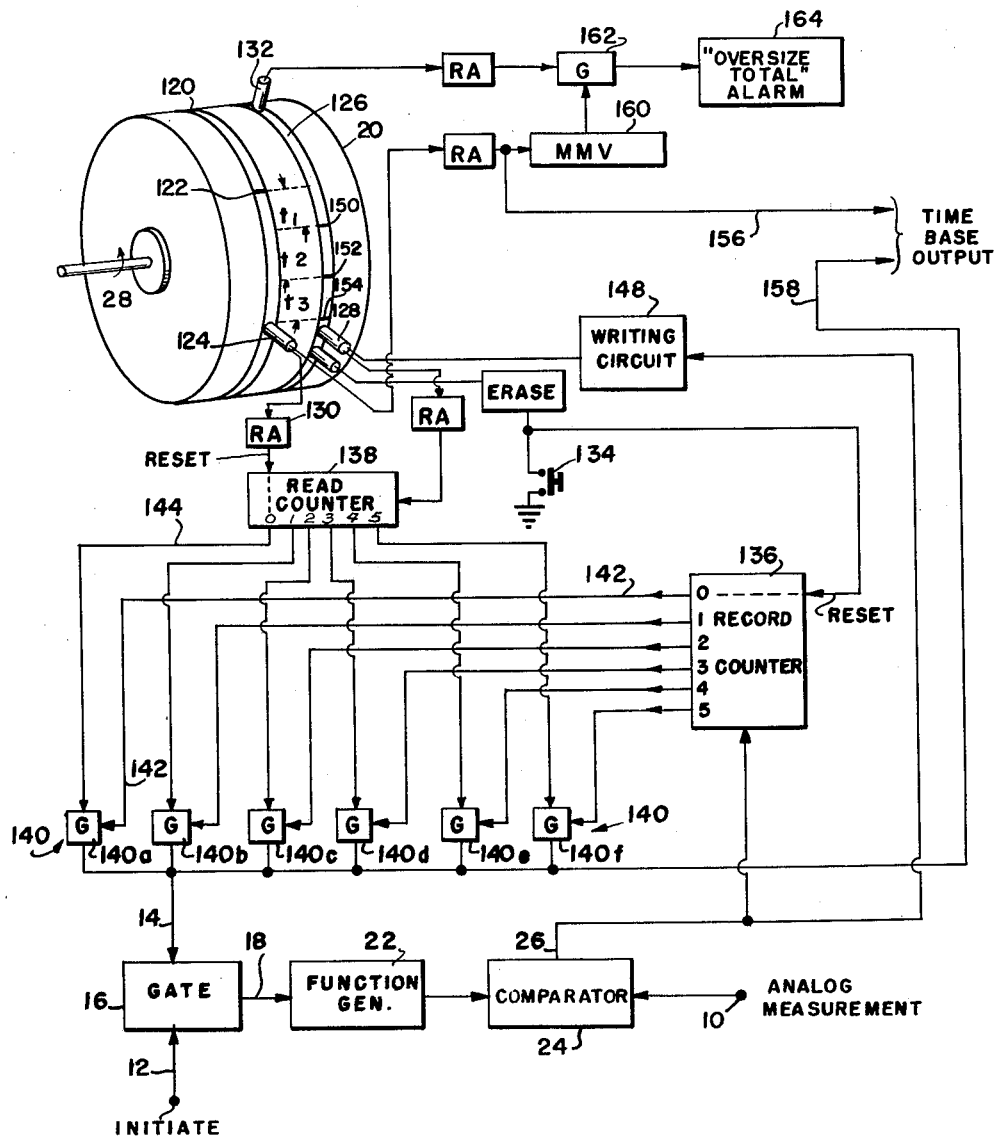

Oct. 23, 1962         H. L. DANIELS ETAL         3,060,409
                      ANALOG SYSTEM
Filed Jan. 31, 1956                         7 Sheets-Sheet 4

INVENTORS
HOWARD L. DANIELS
CURTIS W. FRITZE

BY Cushman, Darby & Cushman
ATTORNEYS

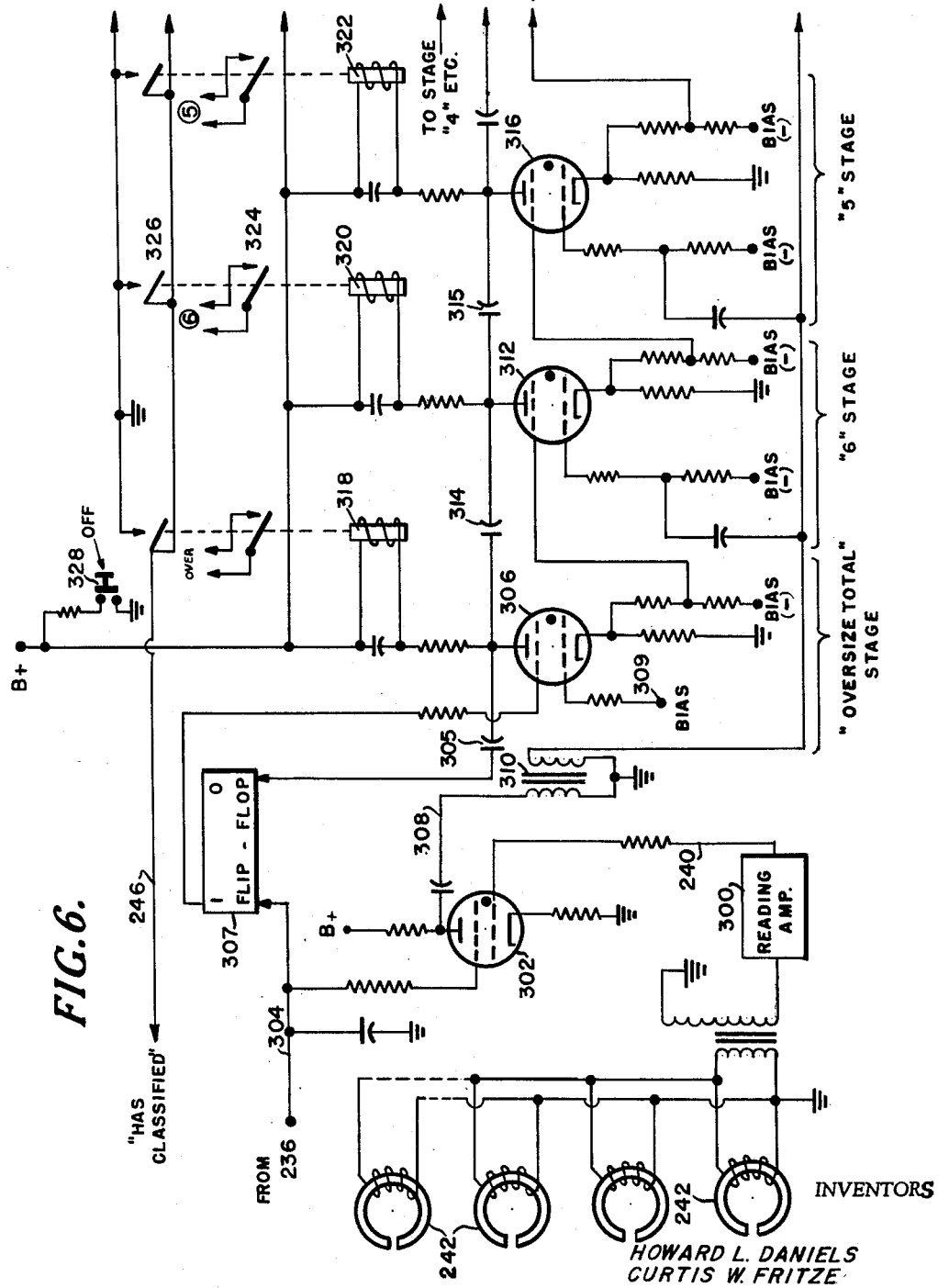

Oct. 23, 1962  H. L. DANIELS ETAL  3,060,409
ANALOG SYSTEM
Filed Jan. 31, 1956  7 Sheets-Sheet 7

INVENTORS
HOWARD L. DANIELS
CURTIS W. FRITZE

BY Cushman, Darby & Cushman
ATTORNEYS 3,060,409
ANALOG SYSTEM
Howard L. Daniels, St. Paul, and Curtis W. Fritze, Arden Hills, Minn., assignors to Sperry Rand Corporation, New York, N.Y., a corporation of Delaware
Filed Jan. 31, 1956, Ser. No. 562,389
60 Claims. (Cl. 340—172.5)

This invention relates to methods and apparatus for storing data and for performing arithmetic and classifying procedures by means of a moving record member such as a drum, disk, endless belt, or the like.

There are several well-known means of employing a record member such as indicated above. One of these is United States Patent 2,540,654, issued to A. A. Cohen et al., which describes apparatus for recording on the surface of an elongated magnetizable member which is adapted to be moved continuously in relation to various magnetic transducing heads. In a specific embodiment therein disclosed, the magnetizable member is in the form of magnetic tape wrapped tightly about the periphery of a rotatable drum, which is accordingly termed a magnetic drum. A drum on which is deposited a magnetizable coating is an equivalent of the tape-wrapped variety disclosed by Cohen. The transducing mechanism for both reading and writing is a so-called magnetic head. When used for writing, the magnetic head produces a fringing flux in the drum surface and, when used for reading, receives a changing flux which by its form identifies the recorded value.

This invention conveniently utilizes a synchronously-rotating magnetic drum, and the recording and play-back of magnetic signals on its surface, although the drum form of the record member is not absolutely required. The recorded indicia are not restricted in position to any predesignated series of cells, but may occupy any position on the magnetizable surface.

In the practice of this invention, a displacement analog method of representation of physical magnitude is used. That is, the magnitude of an item of information is converted to a fraction of the circumference of a synchronously rotating magnetic drum, or in the general case, a length of record member. Or, where the speed of movement of the record is constant, to a time interval representing the time required for the drum to rotate through that fraction of its circumference. Magnetic heads, as in the Cohen et al. patent, may be used to record indicia on the surface of a drum, but other than magnetic recording can be used. For convenience, magnetic techniques are hereinafter mentioned. The indicia in the present invention are used to mark off or otherwise indicate the fraction of the circumference representing the magnitude of an item. Since the magnetic indicia are permanently recorded until they are purposely removed, and since a synchronously-rotating drum maintains a very constant speed and may be stopped and later brought to the same speed, data may be permanently stored in a time-base analog representation. However, the storage of data in a time-base analog representation requires a great deal more recording space than the storage of that data by a digital representation. Therefore, in the practice of this invention, data storage is incidental, and normally each item is stored in time-base analog form only for a relatively brief period of time.

In general, the term "time-base analog" designates a method of representing a magnitude by means of a proportional interval of time, the constant of proportionality being open to arbitrary selection. The term "displacement analog" denotes a method of representing a magnitude by means of a proportional distance measured along a line, the constant of proportionality again being open to arbitrary selection.

In the preferred embodiment of this invention, the displacement analog of the magnitude is the peripheral distance between a pair of magnetized marks on the surface of a synchronously rotating record member such as a magnetic drum. The time-base analog in this case will be defined as the time required for the two magnetic marks determining the displacement analog to pass a fixed station of observation at the periphery of the drum. Evidently the displacement analog and the time-base analog are here related through the parameters of fixed drum radius and constant angular velocity. Accordingly, it is permissible to use the terms more or less interchangeably in describing the manner in which the drum stores the magnitude of the variable.

According to the invention, the displacement analog or time-base analog system of data representation allows simple and accurate arithmetic to be performed on the recording surface with a minimum of external circuitry. For instance, one quantity can be added to another by storing its displacement analog on the drum surface circumferentially adjacent to the time-base of the other so that the sum of two quantities is represented by one continuous displacement analog.

The invention also lends itself to sorting procedures where items are classified according to a property expressible by consecutive ranges of magnitudes. The classifying operation may conveniently be performed by dividing the surface of the drum into sectors and marking off the sector boundaries with magnetic heads. Then by noting the sector into which one extreme of the time-base analog falls at the instant that the other traverses a fixed reference point, the classification for each item is conveniently obtained. Classification may, of course, be made either of the magnitudes of individual entities or of time-base analogs generated in arithmetic procedures.

The performance of arithmetic and classification procedures by digital techniques is invariably cumbersome and often times not economically feasible, particularly when the data to be operated on is initially in analog form. Where a number of objects are to be classified or subjected to an arithmetic procedure according to some variable property, the translation of that variable into electrical digital terms inevitably requires an intermediate translation into an electrical analog. An obvious economy, then, is to perform arithmetic and classification procedures by analog means as by the time-base method of this invention. Since in the practice of this invention, the accuracy and speed are for the most part limited only by the measuring device which produces the electrical analog, it follows that economies realized as compared to digital equipment are not offset by other considerations.

As will be observed from the discussion which follows, the technique employed according to the present invention is that of converting a voltage analog representative of a physical magnitude such as weight into a time-base analog, and converting that in turn to a displacement analog by reference to a record member possessing the characteristic of constant velocity of motion. The process may then be reversed to convert the displacement analog back to a time-base analog, and in turn again to a voltage analog which represents the summation or classification of the original input data. In the event that the end result desired is to classify a summation of magnitudes into one of a series of predesignated ranges, this operation may be performed by relatively simple means which do not involve reversal of the initial conversion procedure.

This invention may be used, for example, in assessing charges against vehicles passing toll gates where the levy is computed according to the weight of the vehicle. In current practice, trucks are weighed an axle or dual axle at a time so that the calculation includes the summation of a small but indeterminate number of weights. Since the authorities controlling toll bridges or highways will in many cases legally define maximum allowable axle and total vehicle weights above which vehicle operators will be penalized, the equipment need not handle individual and total weights in excess of the respective maxima if means for detecting the maxima are included in the equipment. By translating the result of each axle-weighing operation into a time-base representation on a magnetic drum in a manner such that a total time-base analog is obtained, either the exact weight or a weight category for the vehicle may be readily obtained. A portion of the surface of the magnetic drum may be reserved for storing toll rates in digital form in a manner allowing tolls to be assessed without further computation.

Although the description of this invention will now further proceed with some reference to the assessment of tolls against vehicles, it will be appreciated that the invention may be applied to a variety of situations such as the sorting of objects moving along a conveyor belt according to weight, dimension, shading, or other measurable variable.

It is accordingly an object of this invention to provide a system for classifying, summing, or classifying the sum of items according to a measurable variable by converting each measurement of the variable to a proportional period of time which is then converted to a displacement analog representation by recording it on a record member moving cyclically at a constant speed.

More generally, it is an object of this invention to provide a system for using a time-base representation of data to accomplish arithmetic and classification procedures by means of a cyclically-moving, constant speed record member.

It is a further object of this invention to provide a system for performing simple arithmetic and classification by analog means which requires far less circuitry than that needed for electronic digital means but which operates with substantially equivalent speed and accuracy.

It is a specific object of this invention to provide methods and apparatus for storing and summing the axle weights of a vehicle which is weighed either one axle or a pair of axles at a time.

It is another specific object of this invention to provide means for classifying the above-mentioned sum of such weights for toll classification purposes.

Further objects and advantages of this invention will be in part expressed and in part obvious from the following description and in the accompanying drawings, which illustrate some of the different embodiments which the invention may take. In these drawings:

FIGURE 1 is a diagrammatic drawing of a first embodiment of the invention whereby individual items are classified into four categories;

FIGURES 2, 2A and 2B are diagrammatic drawings of other embodiments of the invention whereby a number of tracks on a magnetic drum are reserved for the summation of items in groups not exceeding one less than the number of tracks;

FIGURE 3 is a diagrammatic drawing of a third embodiment of the invention whereby, as compared to the device illustrated in FIGURE 2, the use of more complex associated circuitry allows addition to be performed with only two tracks;

FIGURE 6 is a schematic diagram of a counter which may be employed in the circuit of FIGURE 4;

While each of the four devices used to illustrate the invention utilizes a magnetic drum, it will be appreciated that any moving record member such as a disk or tape loops may be used and that the recording need not be magnetic. It is obvious that other methods might be employed in the practice of this invention; the technique is susceptible of embodiment by photographic recording means, or by recording on punched paper tape, or even alternatively by recording on paper tape ruled with a pen holding a magnetic ink. Other ways will suggest themselves to those skilled in the art. However, the magnetic drum is particularly convenient because of its inherent property of eraseability without volatility. Its recording surface may simultaneously be used for related purposes such as the storage of data to be used as a result of time-base operation or for the storage of the results of such operation.

Figure 4:
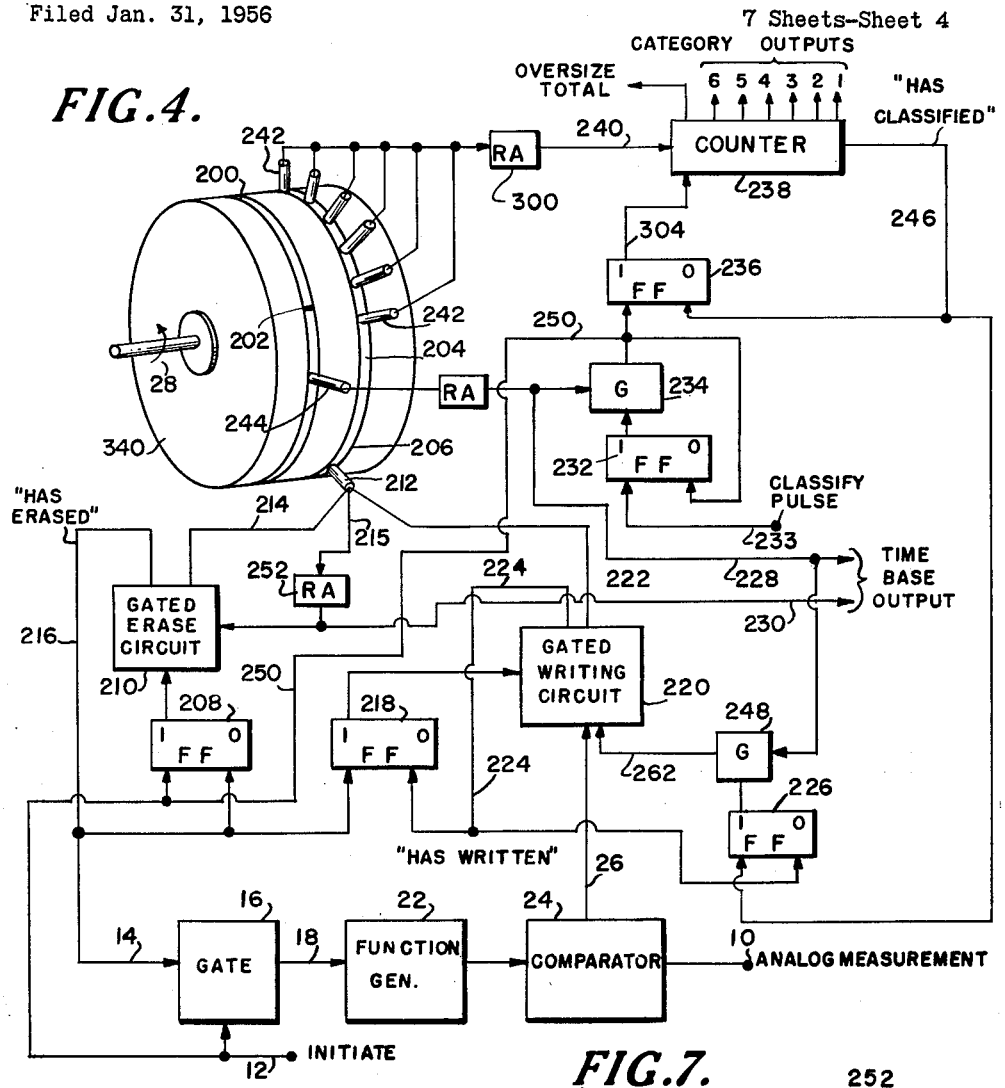
FIGURE 4 is a diagrammatic drawing of a fourth embodiment of the invention whereby a number of items may be summed and the resultant total classified.

Referring now to FIGURES 1–4, wherein the four specific embodiments used to illustrate this invention are presented, the magnitude of each variable to be converted to a time-base analog must first be changed into a proportional electrical measurement or signal magnitude such as voltage by a suitable measuring device (not shown), which measurement appears at terminal 10. The generation of a time-base analog is then accomplished by a conversion of the electrical measurement into a proportional period of time, which conversion may be initiated by an electrical signal on line 18. The signal on line 18 is the result of a signal on line 12, or in the circuits of FIGURES 2, 3 and 4 is in response to electrical indications on both line 12 and an additional line 14. In the latter event, a single pulse gate 16 is utilized to produce an output on line 18 when a signal on line 12 enables the gate to pass a signal from line 14 through the gate to line 18, which output signal initiates the conversion of the D.C. voltage into time. The second electrical indication, that on line 14, may designate that the magnetic drum 20 is in a given position as in FIGURES 2 and 3, that some previous operation is complete, or both, as in FIGURE 4. The electrical indication on line 12, in turn, may designate that the item to be acted upon has been measured, or it could stem from one of a number of operations such as the manual closing of a switch. The pulse on line 18, or on line 12 in the absence of single pulse gate 16, is the signal beginning a time-base analog and when applied to function generator 22 initiates a variable, preferably linearly rising, reference voltage which along with the signal voltage at terminal 10 is applied to comparator 24, which in this case compares the voltages of the two inputs. The delay in time between the initiation of function generator 22 by a time-base analog beginning signal and its ending signal, the latter being emitted on line 26 upon balance of comparator 24, i.e., upon correspondence between its two input voltages, is consequently proportional to the magnitude of the voltage on terminal 10. By translating this period of time into the circumferential distance travelled by a point on the surface of magnetic drum 20 in that time, a displacement analog representation for the magnitude of the measured variable is obtained. The circumferential distance may be bounded either by two indicia or by some stationary point of reference and a single indicium.

In order to use the drum 20 for the storage of data in this manner, the drum must be rotated at a constant speed so that the displacement analog becomes related to the time-base analog, and thus to the original physical magnitude, by a known constant of proportionality. A number of suitable means are available, none of which is shown in the drawings. Ordinarily, a synchronous motor which is driven from a commercial alternating current supply is satisfactory if the frequency of the A.C. source is closely controlled. Where greater precision is required a servo-drive mechanism may be used. A very precise servo mechanism is described in copending application, Serial No. 464,848, filed October 26, 1954, by F. W. Kline Jr., and H. L. Daniels, now Patent 2,864,988. It should be noted that in each case the drum 20 is rotated in the direction indicated by arrow 28.

Reference is now specifically made to FIGURE 1 in which is shown apparatus for classifying items into a number of categories according to the magnitude of a measurable variable. The number of categories into which the items may be classified is determined by the number of playback heads associated with the single track 30 reserved for this purpose. In this case four playback heads 32, 34, 36, 38 allow classification into four categories. The track 30 is also provided with a writing head 40 and a continuously-energized erase head 42.

After an item is measured to produce voltage at terminal 10, classification is initiated by generating a time-base analog in response to a beginning signal on line 12 which energizes writing circuit 44 to cause a magnetic mark or indicium to be written on track 30 through a transducer such as magnetic head 40 and simultaneously initiate a linearly rising reference voltage (see comment in following paragraph) in function generator 22. When voltage comparator 24 senses that this rising voltage equals the voltage at terminal 10, it emits a time-base analog ending signal on line 26 which sets flip-flop 46 to its "1" position. Flip-flop 46 in turn enables gates 48, 50, 52, 54 so that if the mark passes beneath one of heading transducers or heads 32, 34, 36, 38 before it is erased by head 42, a pulse appears on the corresponding output lead 56, 58, 60 or 62 to indicate at least the approximate time duration of the time-base analog, and, therefore, a category selection for the item being classified. The pulse also energizes output detector 64 to reset flip-flop 46 to "0" so that a second category indication cannot be given for the same item.

With respect to the comment in the preceding paragraph regarding the initiation of a linearly rising reference voltage, it will be apparent that other forms of reference voltage may well be employed in the practice of this invention. Input data, for example, may originate in a time-base form, or may alternatively be transferred from another track on the record member. Other forms of voltage than linear may also be used. As suggested hereinabove, the recorded marks might consist of rulings made with a pen holding magnetic ink. The concept is not limited, further, to the addition of displacement analogs; by means of subtracting one analog from another, it is possible to perform the arithmetic operations of subtraction, and by repetition of this, division. By further extension of this line of reasoning and utilizing reference voltages of an appropriate form, logarithmic and exponential operations may be performed.

It will be appreciated that the apparatus of FIGURE 1 makes selection into four categories, the first of which indicates a time-base not exceeding the time required for a point on the surface of drum 20 to move from magnetic head 40 to head 32. The second category indicates a time-base greater than the range of the first category but not exceeding the time elapsed in the drum rotating through the arc subtended by magnetic heads 40 and 34. The third and fourth categories may be similarly defined with respect to heads 36 and 38. Playback head 38 may be so placed that it is impossible for a pulse to be generated on line 26 after the mark recorded by writing head 40 passes head 38. This may be accomplished by presetting the linear function generator 22 so that its peak value is reached before the mark recorded on track 30 passes head 38. When the voltage at terminal 10 exceeds the maximum peak value, it is convenient to sense this fact by an "oversize" alarm 66, either from the signal voltage directly or from the failure of voltage comparator 24 to produce an output. The oversize alarm 66 (FIGURE 1) then becomes a fifth category selector. However, in many applications, the magnitude of the variable by which classification is made will have a known maximum so that no oversize detection is necessary.

A second embodiment of the invention is shown in FIGURE 2 wherein the reservation of six tracks of a magnetic drum 20 and the association of a single magnetic head with each track enables the analog summation of groups of five items or less. Also utilized are two head selection switches which could be electronic but are most conveniently electromechanical and are so depicted in FIGURE 2. One is a recording selector 70 which contains at least two selector arms 71, 72. The first arm 71 is electrically connected through a commutator slide 74 to a reading amplifier 76 while the second arm 72 is connected through commutator slide 78 to writing circuit 80. The recording selector has six terminals or stable positions lettered consecutively A through F. Selector contact arms 71, 72 are mechanically connected together as illustrated by link 73 so that the two arms move over the terminals and always are at adjacent positions with arm 72 one position in advance of arm 71.

To sum a group of five items, the recording selector 70 must initially be set in the position shown in FIGURE 2 with reading arm 71 at position A and writing arm 72 set at B. After the first item is converted to a voltage which appears at terminal 10, an initiation signal is applied to lead 12 to enable single pulse gate 16. The first track 82 on magnetic drum 20 contains a permanently recorded reference mark or indicium 84 which is played back with each drum revolution through reading transducer head 86, and when recording selector 70 is in the position shown, is applied on line 14 to single pulse gate 16. When single pulse gate 16 is enabled by signal on line 12, the next pulse on line 14, generated from reference mark 84, passes gate 16 and causes function generator 22 to begin producing a linear rising reference voltage which on balance with the analog measurement voltage at terminal 10 produces a time-base analog ending signal. This signal is in effect recorded since it causes pulse writing circuit 80 to write a mark 88 through writing transducer 90 on the second track 92. The output of pulse writing circuit 80 also energizes selector stepping mechanism 94 to step head selector arms 71, 72 to positions B, C, respectively. It will be appreciated that the time $t_1$ required for the drum 20 to move through the circumferential distance between reference mark 84 and mark 88 is the time-base analog for the first item in the summation. When the second item is converted to a voltage and a new initiation signal given on line 12, single pulse gate 16 is again enabled to pass the first succeeding pulse generated from mark 88, and the pulse emitted from voltage comparator 24 on balance causes a mark 96 to be written on track 98, the reading arm 92 now being at position C. The third, fourth and fifth items cause marks 100, 102 and 104 to be respectively recorded on the drum.

It will be appreciated that the time elapsed in drum 20 rotating through the angle subtended by reference mark 84 and the mark, 104, generated from the fifth item, is the time-base analog of the sum of the five items. To obtain this sum, the circuit includes a summation selector 106 which is preferably identical to reading selector 70 except that it contains only one contact arm 108 and has only five terminal positions labelled B through F. The arm 108 is preferably mechanically connected to writing arm 72 of recording selector 70 so that the two are always in corresponding positions. Then, each time selector stepping mechanism 94 advances the arms of recording selector 70 and summation selector 106 to a new position and a new mark is recorded on the drum 20, the time delay between the reference mark and the recorded mark appears across leads 110, 112 to give the running sum as a proportional period of time. This time interval can be readily reconverted to a proportional voltage or to digital form and may be used for a variety of purposes. If more than five items are to be summed, the first five may be summed the time interval between pulses on leads 110, 112 used directly to record a new mark 88 on track 92, and four more items added thereto according to the procedure outlined above. However, before further addition can be accomplished, all marks must be erased except reference mark 84, either by means of separate erase heads or through heads not shown used for other purposes.

A modification of the system illustrated in FIGURE 2 is shown in FIGURE 2A to emphasize the fact that recording selector 70 and summation selector 106 need not necessarily be mechanically linked together. In fact, the summation selector can be made with two separate sections so that the sum of any two or more consecutive items may be obtained without reference to the stepped position of the contact arms of the recording selector 70. FIGURE 2A is a fragmentary, schematic view of FIGURE 2, including summation selector 106 slightly modified in that contact arm 108 is electrically connected at its pivot to output line 110. In addition, there is provided a second summation selector 107 having contact terminals B through F connected to corresponding terminals of summation selector 106. The contact arm 109 is pivoted so that output line 111, connected to the arm, may be connected to any one of the contact terminals B through F at will so that a summation output may be obtained between lines 110 and 111 to indicate the sum of any consecutively recorded items in accordance with the setting of contact arms 108 and 109. Alternatively, and in a manner similar to that shown for recording selector 70, summation selector 106 may have a second contact arm disconnected mechanically from the selector stepper 94 (FIGURE 2) and from contact arm 108. Since such contact arms would be movable to any of the terminals at will, a summation of any number of consecutive items is obtainable.

An additional modification of FIGURE 2 is illustrated in FIGURE 2B. Although the drum 20 is illustrated as having only three summation tracks 92, 98 and 100 besides the reference track 82, it will be apparent from the description hereinafter that more tracks may be utilized. In this particular embodiment, selector 114 comprises three annular conductive rings: an erase ring 115, a writing ring 116, and a reading ring 117. Each of the read-write transducing heads A, B and C associated with tracks 92, 98 and 100 is connected to a set of contacts 118A, 118B and 118C, respectively, each contact set having an inner, outer and center contact terminal. Each of these three terminals for each contact set is closely associated with a different selector ring but is insulated therefrom. Mechanically connected to stepper 94 is a set of three brushes 119a, 119b and 119c disposed equidistantly around selector 114 with each brush being in constant contact with a different one of the three selector rings 115, 116 and 117. In this manner, the brushes contact a different one of the contact terminals in a set. In this embodiment there is additionally provided a gate 121 operative by a flip-flip 123 which also provides another input from its "0" output for gate 16'.

In operation, the information on the drum, except for the reference mark 84, is initially erased. This is accomplished by energizing erasure circuit 125 so that the inner of brushes 119, when stepped one revolution of selector 114, contacts all of the inside terminals of the contact sets. Erasure may be caused at the same time as a reset signal is applied to the "0" side of flip-flop 123. This enables gate 16', and when the first item to be measured is presented to terminal 10 and an initiate signal is present on line 12, transducer 86 will read reference mark 84 so that a signal caused thereby will operate function generator 22 and comparator 24 in the heretofore described manner to provide a time-base ending signal on line 26. The ending signal is caused to be written on track 92 as mark 88 via writing circuit 80, writing ring 116, brush 119b, and the center terminal of contact set 118B. Stepper 94 then rotates the set of brushes clockwise so that brush 119c is in contact with the outer terminal of contact set 118B. Therefore, a succeeding item may be recorded on the drum with the recorded mark 88 being the reference mark for the next succeeding item. Mark 88 is read and amplified by reading amplifier 76' to cause a signal on line 18 when gate 121 is opened by an initiate signal on line 12. Under these circumstances, gate 16' is closed by the "0" output of flip-flop 123, so that reference mark 84 no longer initiates function generator 22 after the first item is measured. Successive recordings may be made in like manner, and, as more items are added, the last recorded mark is the summation with respect to the reference mark 84. The time-base analog summation is available on lines 110 and 112 as in the prior embodiments.

It should be pointed out that as the specific embodiments illustrated by FIGURES 2, 2A and 2B have been described, no means is provided for the situation in which the time-base of the sum exceeds the time required for magnetic drum 20 to rotate through a complete revolution. In the applications for which this embodiment is presently envisioned, this problem does not arise. In most electronic applications, speed is of utmost importance, and it is usually desirable to complete a summation in less time than that required for an average magnetic drum to complete one revolution. However, apparatus could be readily provided by one skilled in the art for counting and remembering the number of complete revolutions through which the drum rotates before a mark is recorded and delaying the output on line 110 accordingly when reading out the sum.

Reference is now made to FIGURE 3 which shows alternative apparatus for performing addition. Here only two tracks are utilized but the external circuitry is somewhat more complex as compared to the circuit of FIGURE 2. One track 120 contains a single, permanently recorded reference mark 122 and is provided with a single magnetic transducer or head 124 which is used for playback purposes only. The other track 126 contains at least a dual purpose, read-write transducing head 128 and an erase head 130 and is also shown as having a third magnetic head 132 which is not involved in the summation operation but is included to detect when the sum exceeds a predetermined maximum. To perform an addition, pushbutton switch 134 must first be depressed for a period of time at least equal to one revolution of drum 20 to completely erase track 126 and to reset record counter 136 to zero. At the same time, reference mark 122 will pass beneath magnetic head 124 at least once to reset read counter 138 to zero. The corresponding output leads from read counter 138 and record counter 136 are applied in pairs respectively to the six gates 140 (numbered 140a to f), so that gates 140 may be enabled respectively by one of the six outputs of record counter 136 to pass pulses arriving from the corresponding one of the six outputs of read counter 138. When record counter 136 is at its zero position to produce an enabling voltage on line 142 and read counter 138 is also at its zero position, a pulse is thus able to pass enabled gate 140a to appear on input lead 14 to single pulse gate 16. However, if record counter 136 is at its "1" position to enable gate 140b and the reference indicium 122 again produces an output on line 144, this output is blocked at disabled gate 140a; but, if a pulse is played back from magnetic head 128, read counter 138 is advanced to "1" and the output pulse passes gate 140b to appear on lead 14.

When the first item is measured, the proportional voltage is applied at terminal 10, and an enabling signal placed on lead 12. The next playback of reference mark 122 through magnetic head 124 produces an output on line 144 which passes gate 140a and enabled single pulse gate 16 as a signal to begin a time-base analog by causing a variable signal (preferably a linearly rising reference voltage) from function generator 22 to comparator 24. The time-base analog ending signal produced on line 26 upon balance both sets record counter 136 to its "1" position and causes a pulse writing circuit 148 to record a mark 150 on track 126. The time-base analog of the first item is accordingly represented by the displacement analog $t_1$ which covers the time required for drum 20 to move through the angle subtended by marks 122 and 150.

When the drum 20 completes a revolution, the pulse generated through reading head 124 by reference mark 122 resets read counter 138 to zero. The voltage resulting from the second measurement may now be applied at terminal 10 and a new "initiate" indication given on line 12. When mark 150 next passes beneath head 128, read counter 138 is stepped to its "1" position to apply a pulse to gate 140b which is now enabled from record counter 136. The pulse emitted on line 14 and gated through single pulse gate 16 is accordingly another time-base analog beginning signal and initiates another variable signal from function generator 22. This time upon balance at comparator 24, the ending signal is recorded on track 126 as the summation indicium 152 while record counter 136 is advanced to its "2" position. Reference mark 122 and marks 150 and 152 may all be played back then to step read counter 138 to its "2" position. The third measurement results in the recording of summation mark 154 on track 126. It will be appreciated that the sum of lengths $t_1$, $t_2$ and $t_3$, as marked off in FIGURE 3, represents the time-base of the sum of the three items thus far measured. This time-base appears across output lines 156, 158 at each drum revolution and, like the output across lines 110, 112 of FIGURE 2, may be used for a variety of purposes. It may, for instance, be used to record a first mark on track 126 after the first five items have been summed where it is desired to sum more than five items. Of course, pushbutton 134 must first be energized to erase track 126.

The circuit of FIGURE 3 conveniently includes means for determining when the sum exceeds a given amount. Each time the reference mark 122 is played back through magnetic head 124, a one-shot or monostable multivibrator 160 is energized to enable gate 162. Then, if a mark is played back through magnetic head 132 before the multivibrator 160 shuts off, the resultant pulse will pass enabled gate 162 to energize alarm 164. The period of the multivibrator 160 should, of course, be adjusted so that the multivibrator shuts off just before the reference mark 122 comes abreast of magnetic head 132, assuming that heads 124 and 138 are physically aligned. The maximum recordable time-base is then equal to the time required for a point on the drum to move through the circumferential distance in the direction of arrow 28 from head 132 around to head 124.

At this point it is desirable to point out that it is not generally possible to physically align magnetic heads along adjacent tracks, nor is it necessarily desirable to do so. However, it will be appreciated by those skilled in the art that if magnetic heads are staggered, the marks on the various tracks may still be coincident in time although not actually physically aligned. Referring for the moment back to FIGURE 2, for example, the six heads are shown there in actual alignment for purposes of clarity in the explanation, but in a practical embodiment they would be circumferentially dispersed in a manner dictated by the geometry of the structure.

A circuit whereby an unlimited number of items may be summed, and their sum may be either read out as a period of time or used to select a category, is shown in FIGURE 4. This fourth specific embodiment of the invention utilizes two tracks of magnetic drum 20 and a single magnetic head associated with each track if only a time-base output is desired. To divide the sum into seven categories, six additional playback heads are provided or one for each additional category. One track 200 contains a single, permanently recorded reference mark 202. The other track 204 contains a single mark at all times except during the generation of the time-base analog for a particular item. Initially that mark is electrically aligned with reference mark 202 as will be shown below, and such an initial mark is illustrated in FIGURE 4 as mark 206. All flip-flops are also initially in their "0" positions, and, as will be demonstrated, are left in that position at the conclusion of an arithmetic and/or classification operation.

After the first item appears at terminal 10 as a voltage, the initiate signal on line 12 both enables single pulse gate 16 and sets flip-flop 208 to its "1" position to enable gated erase circuit 210. The next pulse generated by mark 206 passing magnetic head 212 passes over line 215 through reading amplifier 252 and produces a pulse on both output lines 214 and 216 from erase circuit 210. The output on line 214 is of sufficient strength to cause a widely fringing flux to flow from magnetic head 212 which erases mark 206 even though it has advanced a short distance beyond the gap of the head. The "Has Erased" output on the other output line 216 resets flip-flop 208, flip-flop 218 to "1" to enable gated writing circuit 220, and passes enabled single pulse gate 16 as a time-base analog beginning signal which may initiate a linearly rising reference voltage in function generator 22. The ending signal on line 26 at balance of the voltage comparator 24 causes the now enabled gate writing circuit 220 to produce output pulses on two lines 222 and 224. That on line 222 causes a new summation mark to be recorded on track 204 while the "Has Written" pulse on line 224 resets flip-flop 218 and is applied to the "0" side of flip-flop 226 to leave it at that position. With an analog measurement of a second item at terminal 10 and a new initiation signal on line 12, the above procedure is repeated with the summation mark on track 204 again erased and rewritten a distance further along the track corresponding to the time-base of the item measured.

At each revolution of magnetic drum 20, the marks on each track 200, 204, produce pulses which appear on lines 228, 230 respectively and so by time comparison indicate the time-base of the sum of the items thus far entered on the drum.

To determine the classification of an intermediate or total sum, flip-flop 232 is set by a "classify" pulse applied to line 233 to its "1" position to enable gate 234 so that the next playback of reference mark 202 produces an output from gate 234. This sets flip-flops 236 and 208 to "1" and resets flip-flop 232. Flip-flop 236 in turn effectively sets counter 238 to its first (furthermost left, the "oversize total") position, enabling the counter to be stepped by pulses arriving on line 240 from category selecting playback heads 242.

Suppose that the mark on track 204 representing the summation has passed the first two of playback heads at the time reference mark 202 passes beneath magnetic head 244. A string of four pulses then appears on line 240 as the summation mark moves beneath the remaining four of classification heads 242 to step counter 238 to its fifth (from the left) position. As will be demonstrated in connection with FIGURE 6, which is a circuit diagram of counter 238, the absence of a pulse on line 240 for a period of time substantially longer than the time required for the drum to move through the angle subtended by the furthest separated adjacent heads mounted along track 204, including both head 212 and classification heads 242, causes counter 238 to generate an output from the selected position, which in the assumed case is the fourth from the left category output lead marked by the number 3. At the same time, counter 238 emits a "Has Classified" pulse on line 246 indicating that the classification operation is complete, which pulse resets flip-flop 236 and sets flip-flop 226 to its "1" position. This allows the next pulse from reference mark 202 to pass gate 248. However, before the reference mark 202 is able to generate a pulse, the summation mark on track 204 passes beneath magnetic head 212 to energize erase circuit 210. This erases the summation mark and also resets flip-flop 208 and sets flip-flop 218 to enable gated writing circuit 230. The reference pulse from mark 202 immediately follows, passes through gate 248, and causes the now enabled writing circuit 220 to write a new initial indicium 206 on track 204 in electrical alignment with reference mark 202, thus preparing the drum for a fresh problem.

In certain cases it may be desirable to classify a sub-total and to retain the summation mark. To do so, it is only necessary to prevent pulses from flowing on lines 246 and 250, by including in those lines either gates (which are enabled or disabled according to whether a total or sub-total is being processed) or manual or electromechanical switches.

Figure 5:
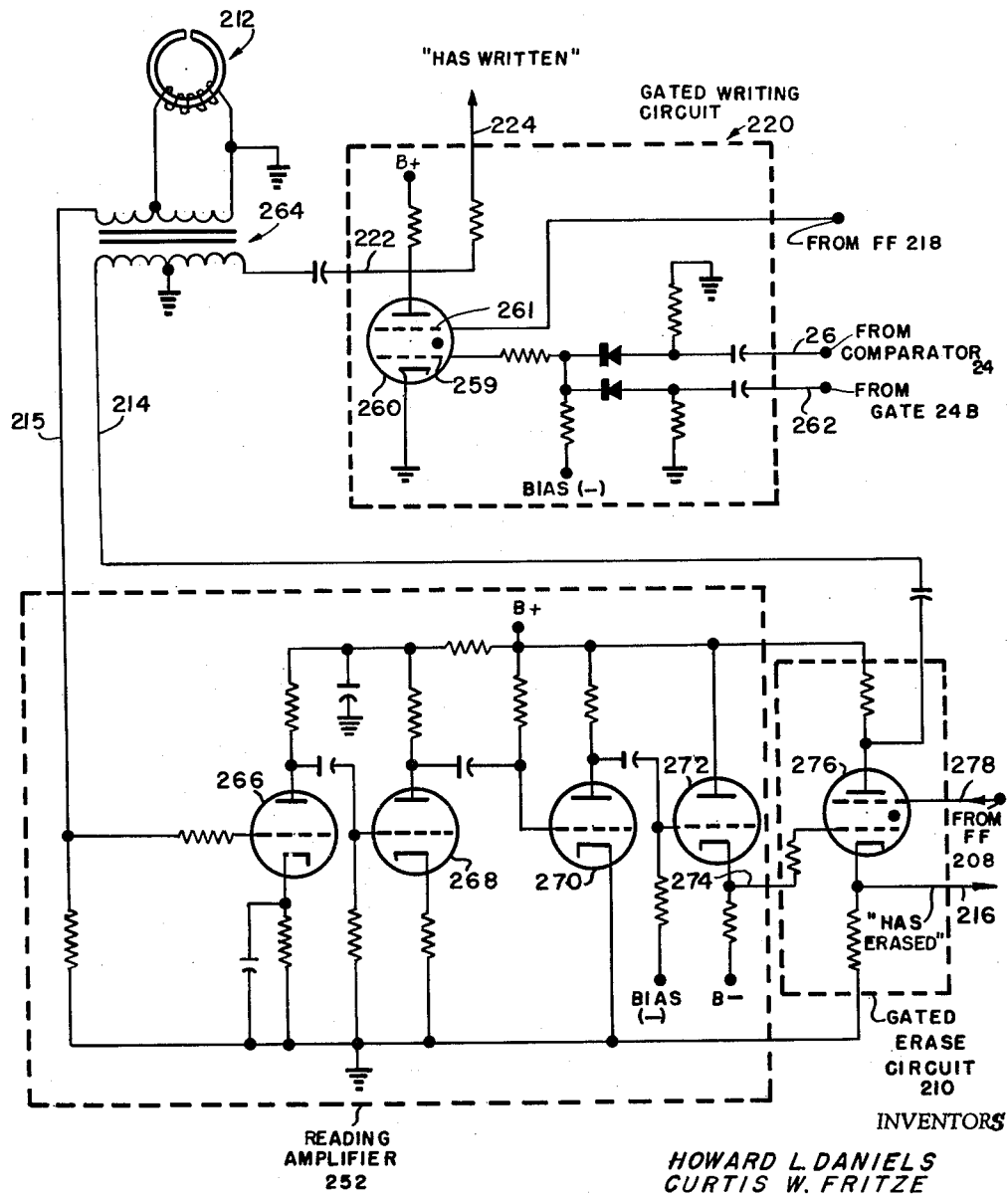
FIGURE 5 is a schematic diagram illustrating circuitry suitable for writing, reading and erasing indicia in the practice of this invention, particularly as these circuits are used in conjunction with a single magnetic head in the embodiment of the invention illustrated in FIGURE 4.

Certain apparatus incorporated in the circuit of FIGURE 4 may require additional explanation. Reference is accordingly made to FIGURE 5 which illustrates circuitry suitable for use in the blocks labelled gated writing circuit 220, gated erase circuit 210, and reading amplifier 252 as these circuits are interconnected and associated with magnetic transducing head 212. In the gated writing circuit 220, the control grid 259 of thyratron 260 is normally biased sufficiently negative so that a positive voltage at its screen grid 261 resulting from flip-flop 218 being in the "1" state is insufficient to bring thyratron 260 to conduction. In addition, if flip-flop 218 is at its "0" position, the screen grid is biased negative and a positive pulse on either of its two input leads 26 or 262 cannot overcome the bias so that thyratron 260 remains non-conducting. However, when flip-flop 218 is set at "1," the bias on screen grid 261 is less negative and a pulse on an input lead 26 or 262 brings thyratron 260 to conduction to produce a pulse on line 222 which passes through transformer 264 to apply a short current pulse to magnetic head 212 in the direction to cause the area of magnetizable drum surface beneath the magnetic head at that instant to be magnetized in the arbitrarily selected "1" polarity.

Each time that cell passes beneath magnetic head 212, a very small pulse appears on lead 215. This pulse is passed through three stages of amplification 266, 268, 270 and cathode follower 272 to provide a pulse with a sharp leading edge and low impedance on line 274. It should be noted that triodes 266, 268, 270, 272 are preferably included in two envelopes for purposes of economy.

The pulse on line 274 brings thyratron 276 to conduction if an enabling voltage is present on lead 278 from flip-flop 208. The resultant pulse on line 214 causes the area below magnetic head 212 to be magnetized in the "0" or erased direction. Since head 212 is thus energized normally less than one microsecond after the mark appeared beneath its gap, the mark is still close to the gap and well within the erasing field. The driving of thyratron 276 to conduction also produces an output on lead 216 which signals that the mark has been erased and is applied as shown in FIG. 4 to single pulse gate 16 and to the "reset" input of flip-flop 208 and "set" input of flip-flop 218.

Reference is now made to FIGURE 6 which illustrates circuitry suitable to perform the category selecting function of counter 238. Each time the summation mark on track 204 passes beneath one of classification heads 242 (shown connected in parallel although serial connection is as preferable), a pulse is emitted on line 240 from reading amplifier 300, which incidentally may be identical to reading amplifier 252 illustrated in FIGURE 5. Each pulse then brings gating tube 302 momentarily to conduction if an enabling voltage is present on line 304. This enabling voltage also sets flip-flop 307 to "1" to provide an output therefrom, which in conjunction with the bias at terminal 309, is sufficient to cause the first stage thyratron 306 to conduct. Conduction by thyratron 306 causes a negative swing in potential at its plate which is applied through condenser 305 to set flip-flop 307 to "0" to remove an enabling voltage from thyratron 306. This does not extinguish thyratron 306, however, and the thyratron continues to provide a cathode voltage for enabling thyratron 312 in the second stage of the counter. When gating tube 302 momentarily conducts, a pulse appears on line 308 and passes through transformer 310 to the lower control grid of every thyratron in the counter except thyratron 306. However, since of these only thyratron 312 is enabled at its upper grid, the output from transformer 310 drives only thyratron 312 to conduction, and the resultant negative swing in potential at its plate is applied via condenser 314 to the plate of thyratron 306, thus extinguishing thyratron 306.

The succeeding pulse from thyratron 302 now finds only thyratron 316 enabled and drives it to conduction extinguishing thyratron 312 by the negative swing of the plate of thyratron 316 coupled to the plate of thyratron 312 through capacitor 315.

Whenever one of the thyratrons 306, 312, 316, etc., is conducting, a current flows through one of the coils of relays 318, 320, 322, etc., respectively. The relays 318, 320, 322, etc., are designed to require current to continue to flow in the plate circuit of the associated thyratron longer than that time required for drum 20 to rotate through an angle equal to the largest angle subtended by any two adjacent classification heads 242 or between the first classification head and magnetic head 212, before actuation occurs, by means of capacitors across the relays. In other words, no relay 318, 320, 322, etc., can be energized until after the summation mark on track 204 passes the last of classification heads 242, and when the energized thyratron remains conducting for longer than the required pull-in time, the corresponding relay contacts are closed. If, for instance, the summation mark on track 204 is located between the last two of classification heads 242 at the moment reference mark 202 is played back, only one pulse will appear on line 240 before the summation mark passes beneath head 212 and is erased. After a short delay, relay 320 is energized to close contacts 324 and 326. The former close the category output line indicated by encircled number 6, which output may be used in a variety of ways such as to cause an article moving on a conveyor belt to be forced into a certain stock pile. The latter contacts 326 connect line 246 to a reference potential such as ground. This may be utilized as a "Has Classified" signal to reset flip-flop 236 and to set flip-flop 226 to "1" in the circuit of FIGURE 4. The counter may then be "reset," i.e. turned off, by energizing pushbutton switch 328 to cause the plate of the conducting thyratron, in this case thyratron 312, to take a negative swing in potential to cut it off.

Figure 7:
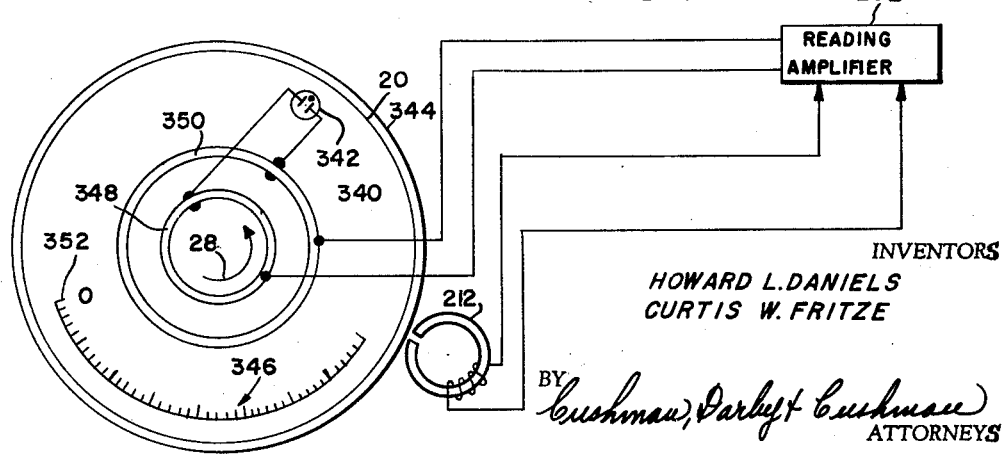
FIGURE 7 illustrates means for modifying the embodiment of this invention illustrated by FIGURE 4 to obtain a visual presentation of the running total of items being summed.

Reference is now made to FIGURE 7 to illustrate means for visually comparing the recorded position of the latest recorded ending signal with the position of the reference mark by modifying the circuit of FIGURE 4 to obtain a visual indication of the sum. Fastened to one end 340 of the magnetic drum 30 at a point near the periphery is a glow discharge device such as neon indicating light 342. Rigidly mounted out of contact with the drum 20 but close to the end 340 thereof is a transparent plate 344. A circular scale 346 etched on the plate 344 is so positioned that as neon light 342 is rotated it moves along scale 346 over its entire length. The transparent plate 344 is also provided with a pair of commutator slides 348, 350 by means of which electrical indications are transmitted to neon indicator light 342. The commutator slides 348, 350 are in turn connected to output lines from magnetic head 212 by way of reading amplifier 252. When magnetic drum 20 is rotated, each time the mark recorded on track 204 passes beneath magnetic head 212, the output pulse causes neon indicator 342 to light momentarily. Because the drum 20 will ordinarily be rotated at a relatively high speed, neon indicator 342 will appear as a stationary light. By positioning neon indicator 342 and magnetic head 212 so that the neon bulb 342 is at the zero position 352 of scale 346 at the moment the initial mark 206 passes beneath head 212, the visual indicating system is properly aligned. The scale 346 may then be calibrated, or in a system used for only a single type of problem, the scale 346 may initially be scaled and labelled to read the magnitude of each sum directly.

Figure 8:
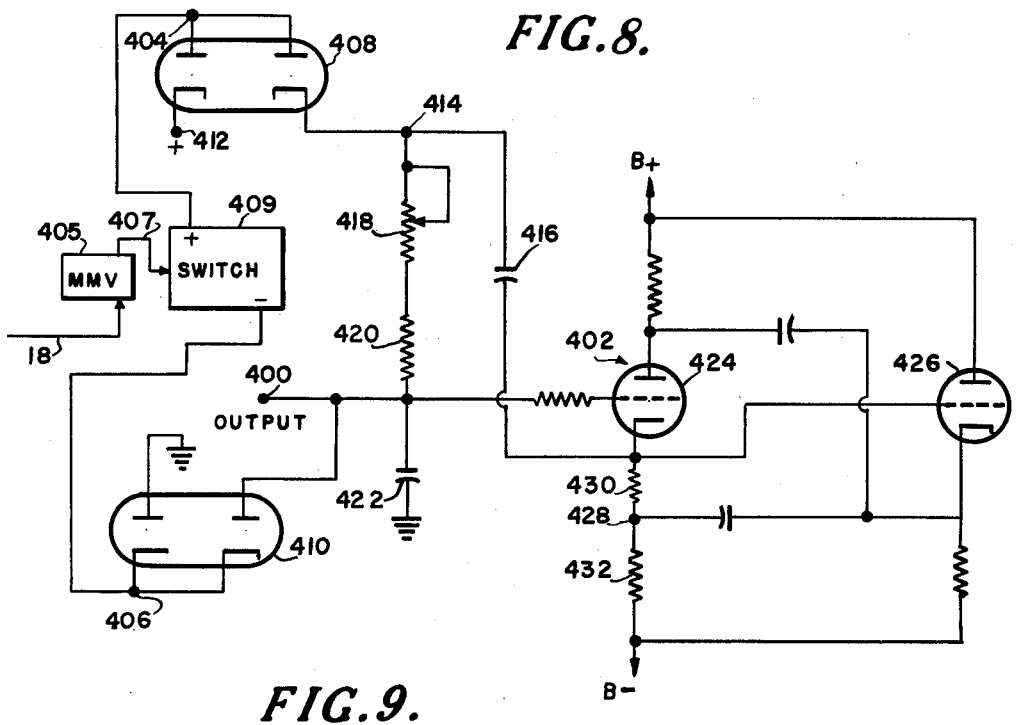
FIGURES 8 and 9 are examples of circuitry usable in FIGURES 1–4.
Figure 9:
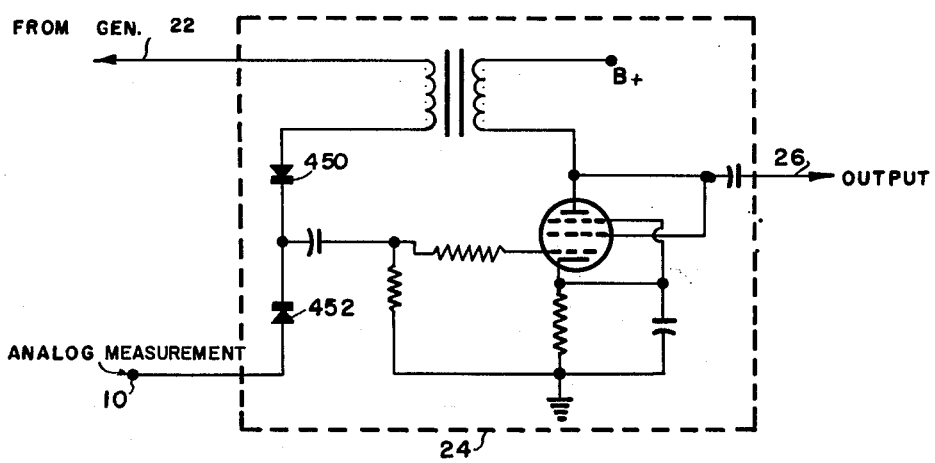

As mentioned previously, function generator 22 may provide a reference signal of any desired type and form. FIGURE 8 illustrates a circuit designed to generate a saw tooth or linearly rising voltage waveform. No limitation is intended by this example of the function generator, however, since the output thereof may be variable other than linearly and in terms other than voltage. In FIGURE 8 the circuit provides at terminal 400 an output whose linearly rising time is determined by a separate, control circuit 402. To prevent an output to terminal 400, steady potentials are applied to terminals 404 and 406, the former being positive and the latter negative and each being derived from any suitable source as from within switching means 409. Therefore, both gating tubes 408 and 410 normally conduct to cause the voltage at output terminal 400 to be zero with respect to ground potential; and since a reference potential (of value less than the potential at junction 404) is continuously applied to the cathode terminal 412, the conduction of gating tube 408 causes the potential at junction 414 to be the same as the reference potential at terminal 412.

In order to provide a linearly rising output from terminal 400, the steady potentials are removed from junctions 404 and 406. This may be accomplished by allowing a beginning signal on line 18 (see FIGURES 1–4, also) to energize a multivibrator such as monostable multivibrator 405 to provide a temporary output on line 407. This output is then delivered to switching means 409, which may include either an electromechanical or electronic switch, to cut off the potentials delivered therefrom to junctions 404 and 406. It should be understood that the period of time monostable multivibrator 405 provides an output on line 407 before reverting to its stable state is at least as great as the time required by the remainder of the circuitry of FIGURE 8 to provide a maximum potential output at terminal 400; alternatively, the multivibrator 405 may be a bistable multivibrator which is reverted to its other state by an ending signal from line 26 (FIGURES 1–4, 9).

To continue with the operation of the circuitry of FIGURE 8, it will be recalled from the above that upon removal of the potentials from junctions 404 and 406, terminal 400 is initially at zero potential while junction 414 is at the reference potential. However, condenser 416 will charge through diodes 404 and 408, and condenser 422 will charge through resistors 418 and 420. This causes the grid voltage of tube 424 to rise also. The cathode of tube 424 likewise rises so as to maintain a constant voltage across condenser 416. Tube 426 enhances this action by causing a constant voltage to appear across the plate of tube 424 and the reflex terminal point 428 between resistances 430 and 432. The condition of constant voltage across condenser 416 insures constant current flow through resistors 418 and 420 to cause a linear rise of potential at output terminal 400.

Comparator 24 will, of course, take a form corresponding to the type inputs it is to receive. If the function generator 22 provides a linearly rising voltage and the signal at terminal 10 is a voltage analog, the circuit of FIGURE 9 will compare the two voltages and provide an output when correspondence therebetween is detected. This example of a voltage comparator 24 is essentially a controlling blocking oscillator. The theory of operation is well known to those skilled in the art. The conventional blocking oscillator is modified to form the present voltage comparator by insertion of the crystal diodes 450 and 452, the former being in the positive feedback loop. Obviously, when diode 450 is conducting, the positive feedback loop is complete and the circuit acts as a normal blocking oscillator and will continue to fire, generating short pulses onto line 26 at a repetition rate governed by the values of internal circuit parameters. Diode 450 will conduct and cause an output on line 26 when the voltage from generator 22 even slightly exceeds the voltage at termial 10. The value of this type circuit as a voltage comparator depends on the stable, sharp break of crystal diode 450 from non-conduction to conduction and vice versa. When the voltage at terminal 10 exceeds the voltage from generator 22, diode 450 cannot conduct the positive feedback current and no output appears on line 26.

The other apparatus indicated in block form in FIGURES 1–4 is well known to those skilled in the art, and circuitry therefor need not be specified. Flip-flops, counters, and gates, for instance, are well known in the electronics art, and the means for writing and reading marks on the surface of magnetic drum 20 specified for the circuit of FIGURE 4 are applicable with slight modification to the circuits of FIGURES 1–3.

It will be appreciated that the invention is susceptible of numerous modifications without departing from the concepts thereof, and it is accordingly intended that the matter included in the foregoing specification and in the accompanying drawings be considered as illustrative and not limitative, the scope of the invention being defined in the appended claims.

What is claimed is:

1. Apparatus comprising a record member movable at constant velocity, means to generate a time-base analog representation of a given quantity in response to a signal for beginning said analog representation, the generating means including means for producing a continuously changing signal which upon attaining a predetermined characteristic corresponding to a characteristic of said quantity causes an output which is the ending signal of said analog representation, first transducing means for referring said beginning signal to the position of said record member relative to said transducing means at the time occurrence of said beginning signal, and means including further transducing means associated with the record member for referring said ending signal to the position of said record member relative to said further transducing means at the time occurrence of said ending signal for indicating at least the approximate time duration of said time-base analog representation.

2. Apparatus as in claim 1 wherein the generation means includes means to convert an electrical signal magnitude into said time-base analog representation.

3. Apparatus as in claim 1 wherein the first transducing means is connected to receive and record said beginning signal on said record member, and wherein said further transducing means includes a plurality of transducers spaced along the record member to read successively the record of the beginning signal, and the time duration indicating means includes a plurality of gating means connected respectively to said transducers for passing an output therefrom when enabled, and means responsive to said ending signal for enabling the gating means and responsive to an output of the gating means for disabling the gating means, the arrangement being such that the record of the beginning signal is read from the moving record member by only one of said transducers while the gating means are enabled so that only one of the gating means has an output to thereby indicate at least the approximate time duration of the time-base analog representation.

4. Apparatus comprising a record member movable at constant velocity, means to generate a time-base analog signal representative of a given electrical signal in response to a signal for beginning said analog signal, the output of the generating means being an ending signal of said analog signal, said generating means including means responsive to said beginning signal for producing a continuously changing reference signal and means for comparing the reference signal and said given signal to produce said ending signal when the reference and given signals attain a predetermined relationship, transducing means for recording on said record member at least one of said beginning and ending signals, and means including reading transducing means associated with the record member for indicating at least the approximate time duration of at least said time-base analog signal.

5. Apparatus as in claim 4 wherein the means for producing a reference signal causes a continuously linear increase in magnitude in the reference signal and wherein the means included in the generating means converts the magnitude of said given electrical signal into the time-base analog signal, said predetermined relationship being equality of the magnitudes of the reference and given signals.

6. Apparatus as in claim 4 wherein the recording means is coupled to receive and record said ending signal, and wherein said record member has a pre-recorded reference indicium and said reading means includes transducers to read the reference indicium and the record of the ending signal respectively, the reading of the reference indicium causing said beginning signal and a time-base analog representation, the ending signal of which when recorded and read in reference to the reference indicium indicates the time duration of the time-base analog representation.

7. Apparatus as in claim 4 wherein the recording means is coupled to receive and record said ending signal, and wherein said record member has a pre-recorded reference indicium and said reading means includes transducers to read the reference indicium and the record of the ending signal respectively, and wherein the time duration indicating means includes reading counter means responsive to the reading of the reference indicium and of the record of the ending signal to provide an output which in reference to a signal from the reference indicium indicates the time duration of a time-base analog representation.

8. Apparatus as in claim 4 wherein the recording means is coupled to receive and record said ending signal, and wherein said record member has a reference indicium and an erasable indicium in separate recording areas, said ending signal being recorded in the same area as the erasable indicium, and wherein said reading means includes a first transducer to read the reference indicium and a second transducer integrally associated with said recording means for reading the erasable indicium and the record of the ending signal, said indicating means including erasure means connected to the second transducer in such a manner that the reading of said erasable indicium causes erasure thereof and initiates said beginning signal and a time-base analog representation, the ending signal of which when recorded and read in reference to the reference indicium indicates the time duration of a time-base analog representation.

9. Apparatus as in claim 4 wherein the recording means is coupled to receive and record said ending signal, said record member having a reference indicium and an erasable indicium in separate recording tracks, said ending signal being recorded in the same track as the erasable indicium; said reading means including a first transducer for reading said reference indicium, means in said recording transducing means for reading the erasable indicium, and a plurality of reading transducers disposed to read the recorded ending signal successively; erasure means coupled to said erasable indicium recording and reading means for erasing the erasable indicium after reading same and generating said beginning signal to initiate generation of said time-base analog signal as aforesaid; and means coupled to said first transducer and commonly to the outputs of each of the said reading transducers for indicating the number of said reading transducers that read the recorded ending signal after the reading of said reference indicium by said first transducer to thereby indicate at least approximately the time duration of at least said time-base analog signal as aforesaid.

10. Apparatus as in claim 9 wherein said reference indicium is effectively cyclic and said erasable indicium is positioned on said record member so as to be read by its said reading means at substantially the same time as said first transducer reads said reference indicium near the beginning of a cycle during which said time-base analog signal is generated and resultant said ending signal is recorded, the reading of the reference indicium near the begining of the next cycle being the said reading thereof after which the number indicating means indicates the number of said reading transducers that read the recorded ending signal during that next cycle to provide an indication at least approximately of the time duration of said time-base analog alone.

11. Apparatus as in claim 9 wherein said reference indicium is effectively cyclic and said erasable indicium is positioned on said record member so as to be read by its said reading means a given time after the reading of said reference indicium by said first transducer near the beginning of a cycle during which said time-base analog is generated and resultant said ending signal is recorded, the reading of the reference indicium near the beginning of the next cycle being the said reading thereof after which the number indicating means indicates the number of said reading transducers that read the recorded ending signal to provide an indication at least approximately of the time duration of said time-base analog plus said given time.

12. Apparatus comprising a record member effectively movable at a constant velocity, means to generate a time-base analog representation, the generating means including means for producing a continuously changing signal which upon attaining a predetermined characteristic causes an output which is the ending signal of said analog, and means to convert said time-base analog representation into a displacement analog on said record member.

13. Apparatus as in claim 12 wherein the generation means includes means for receiving an electrical measurement and comparing said measurement with a variable electrical signal in response to a signal for beginning said time-base analog representation to provide an ending signal when the variable signal corresponds to said measurement, said ending signal indicating in conjunction with the beginning signal the time duration of said time-base analog representation.

14. Apparatus as in claim 13 wherein the generation means further includes a linear function generator having said variable electrical signal as its output and gating means for gating said beginning signal to the generator to start the comparison.

15. Apparatus as in claim 12 wherein the generation means operates in response to a signal for beginning said time-base analog representation and produces an ending signal, the time between the beginning and ending signals representing the duration of the time-base analog representation, and wherein the means for converting said time-base analog representation into a displacement analog representation includes means for recording said ending signal on the record member while the record member is effectively moving at said constant velocity, the arrangement being such that the distance of record movement between the occurrence of said beginning and ending signals is said displacement analog representation.

16. Apparatus comprising means for generating a time-base analog representation in response to a signal for beginning said analog representation, the output of said means being an ending signal of said analog representation, a record member effectively movable in cycles at constant velocity, recording means associated with said record member for recording thereon said ending signals successively and means for comparing the recorded position of the latest recorded ending signal with a predetermined position on said record member.

17. Apparatus as in claim 16 wherein the generating means includes means to convert an electrical measurement into said time-base analog representation.

18. Apparatus for summing time-base analog representations comprising means for generating said time-base analog representations in response, respectively, to signals for beginning said analog representations, the output of the generating means being ending signals of the analog representation, respectively, a record member effectively movable at constant velocity, reading means for reading predetermined pre-recorded indicium on the record member to at least aid in causing the beginning signals of said time-base analog representation, recording means for recording said ending signals on the record member while same is effectively moving at said constant velocity, the distance on the record member effectively moved by the record member between the beginning and ending signals of a time-base analog representation being the corresponding displacement analog representation, the arrangement being such that the record of an ending signal becomes at least part of the read predetermined pre-recorded indicium for causing the beginning signal of the following time-base analog representation so that the displacement analog representations are contiguous and represent in totality the summation of the generated time-base analog representation.

19. Apparatus as in claim 18 wherein the generating means includes means to convert electrical measurements into said time-base analog representations, respectively, said apparatus then operating in effect to sum said electrical measurements.

20. Apparatus for summing time-base analog representations comprising means for generating said time-base analog representations in response respectively to signals for beginning said analog representations, the output of the generating means being ending signals of the analog representations, respectively, a record member effectively movable in cycles at constant velocity and having a reference indicium recorded thereon and further having a plurality of areas reserved for the recording thereon of said ending signals respectively, transducing means including integrally associated reading and recording means for the reference indicium and for each of the reserved record areas, recording selector means comprising a plurality of terminals connectable in predetermined order to the transducing means respectively, an output line and an input line, and means permitting the output line and input line to be connected in predetermined sequence respectively to predetermined twos of said terminals, the output and input lines being coupled to the generating means for delivery thereto of said beginning signals and receipt therefrom of said ending signals respectively, summation selector means having a plurality of inputs connected respectively in said predetermined order to the reading means for the reserved record areas, an output, and means for connecting the output to the individual inputs in the same predetermined sequence as said input line of the recording selector means is connected to its terminals, and means for effecting said predetermined sequence for the recording and summation selector means simultaneously, the sequences thereof being in response respectively to said ending signals, the arrangement being such that the reading of said reference indicium causes a beginning signal for generation of a time-base analog representation whose ending signal is then recorded on one of the reserved areas and causes the connection sequence effecting means to operate in a manner such that the reading of the just recorded ending signal provides a new beginning signal for another time-base analog representation, the process being repeated in like manner for each of the successive time-base analog representations generated, and the summation selector means providing at its output a signal which with reference to a signal from said reference indicium indicates the sum of the time-base analog representations.

21. Apparatus for summing time-base analog representations comprising means for generating said time-base analog representation in response respectively to signals for beginning said analog representations, the output of the generating means being ending signals of the analog representations respectively, a record member effectively movable in cycles at constant velocity and having a reference indicium recorded thereon and further having a plurality of areas reserved for the recording thereon of said ending signals respectively, transducing means including integrally associated reading and recording means for the reference indicium and for each of the reserved record areas, recording selector means having a plurality of terminals one of which is coupled to the transducing means for said reference indicium and the others of which are coupled respectively with the remaining transducing means, said recording selector having further two contacts mechanically connected to move in predetermined sequence from one set of two of said terminals to other sets of two terminals, both of the contacts being coupled to the generating means for delivery thereto of said beginning signals and receipt therefrom of said ending signals respectively, summation selector means having a plurality of terminals coupled respectively with the reading means for each of said reserved areas and contact means movable in conjunction with the two contacts of said recording selector and in step therewith along said summation selector terminals, and means for moving the contacts of said recording selector means and summation selector means in said predetermined sequence in response to said ending signals respectively, the arrangement being such that the reading of said reference indicium causes a beginning signal of a time-base analog representation whose ending signal is recorded on one of the reserved areas and causes the recording selector contacts to move to a position such that the appearance on the record of the just recorded ending signal at the reading means associated therewith causes a new beginning signal for another timebase analog representation, the process being repeated in like manner for each of the successive time-base analog representations generated, and the summation selector providing a signal at each of its positions to indicate with reference to a signal from said reference indicium the sum of the time-base analogs.

22. Apparatus for summing time-base analog representations comprising means for generating said time-base analog representations in response respectively to signals for beginning said analog representations, the output of the generating means being ending signals of the analog representations respectively, a record member effectively movable in cycles at constant velocity and having recorded thereon a reference indicium, the record member further having at least one area reserved for the recording thereon of said ending signals, reading means for reading the reference indicium, transducing means including integrally associated reading and writing means for reading and writing respectively on the reserved area of said record member, reading counter means having a plurality of positions and an output line from each position, said counter means being associated with the reading transducing means for advancing the counter means from one position to the next in response to read discrete recordings respectively, said reference indicium reading means being connected to said reading counter means for resetting the counter means to a predetermined position each cycle of the record member, said output lines being coupled together to provide a beginning signal from the reading counter means and said transducing means causing an ending signal indicium to be recorded on said reserved area while the record member is effectively moving at said constant velocity in response to each of the ending signals, the arrangement being such that a reference indicium signal resets the reading counter means while the transducing means reads the number of discrete indicia recorded in said reserved area which indicia cause the reading counter means to advance a corresponding number of positions to provide an output therefrom which in reference to a signal from the reference indicium indicates the summation of said time-base analog representations.

23. Apparatus as in claim 22 further including means for indicating when the summation of said time-base analog representations is greater than a predetermined amount.

24. Apparatus as in claim 23 wherein the last mentioned means comprises a second reading means associated with said reserved area and disposed a predetermined distance in the direction of record movement from the reference indicium reading means, means for signaling upon receipt of an output from said second reading means, gating means for gating the second reading means output to the signaling means, and a monostable multivibrator connected to control the gating means in response to a reading of the reference indicium, the arrangement being such that upon receipt of a signal from the reference indicium and for a time corresponding substantially to said predetermined distance, said multivibrator enables the gating means to supply an input to the signaling means if any indicium on the reserved area passes the second reading means during said time.

25. Apparatus for summing time-base analog representations comprising means for generating said time-base analog representations in response respectively to signals for beginning said analog representations, the output of the generating means being ending signals of said analog representations respectively, a record member effectively movable in cycles at constant velocity and having recorded thereon a reference indicium, the record member further having at least one area reserved for the recording thereon of said ending signals, reading means for reading the reference indicium, transducing means including integrally associated reading and writing means for reading and writing respectively on the reserved area of said record member, reading counter means having a plurality of positions with an output line from each position, said counter means being associated with the reading means of said transducing means for advancing the counter means from one position to the next in response to read discrete recordings respectively, said reading means associated with the reference indicium being connected to said reading counter means for resetting the counter means to a predetermined position each cycle of the record member, record counter means having a like plurality of associated output lines and positions and being connected to step from one position to the next in response to successive ending signals, and a plurality of gating means enabled respectively when an output appears on the output lines from said record counter means, said plurality of gating means being further connected respectively to the output lines of the said reading counter means to pass, when enabled, a beginning signal from the reading counter means, said transducing means causing an indicium to be recorded on said reserved area while the record member is effectively moving at said constant velocity in response to each of the ending signals, the arrangement being such that a reference indicium signal resets the reading counter means while the transducing means reads the number of discrete indicia recorded in said reserved area, which indicia cause the reading counter means to advance a corresponding number of positions to provide an output from the gating means associated therewith and an indication with reference to a signal from said reference indicium of the summation of said time-base analog representations.

26. Apparatus for summing time-base analog representations comprising means for generating said time-base analog representations in response respectively to signals for beginning said analog representations, the output of the generating means being ending signals of said analog representations respectively, a record member effectively movable in cycles at constant velocity and having erasable summation indicium recorded thereon initially in a predetermined position of a reserved area therefor, said predetermined position indicating zero summation, transducing means associated with the reserved area for reading, erasing, and writing each of the summation indicium successively appearing on said reserved area during movement of the record member relative to the transducing means, erasure means associated with said transducing means for causing erasure of a summation indicium in response to a reading thereof which at the same time produces through said erasure means a beginning signal to cause a succeeding time-base analog representation the ending signal of which is written on the reserved area by said transducing means as a summation indicium, the distance on the record member effectively moved by the record member between the signals beginning and ending a time-base analog representation being the corresponding displacement analog representation and the record of an ending signal of one time-base analog representation being a record of the beginning signal of the next succeeding time-base analog representation so that the displacement analog representations are contiguous on the record member, and means to compare the position of a summation indicium relative to said predetermined position to obtain an indication of the summation of the displacement analog representations which correspond to the time-base analog representations generated.

27. Apparatus as in claim 26 further including means to classify a summation indicium comprising a plurality of reading means spaced from each other a predetermined distance along said reserved area on the record member, counter means having a plurality of positions movable from one to the next in response to successive inputs when enabled, and means for enabling said counter means upon a reading of said reference indicium, the outputs of the plurality of reading means on said reserved area being connected together to permit successive inputs therefrom to the counter means, the arrangement being such that upon enablement of the counter means, the successive reading of the summation indicium then in said reserved area on the moving record member, respectively, by the remainder of the plurality of reading means past which the summation indicium has not previously moved causes said successive inputs equal in number to said remainder of reading means to move the counter means to one of its positions for indicating the classification of the summation indicium.

28. Apparatus as in claim 26 wherein the indicium position comparison means comprises a reference indicium pre-recorded on said record member in electrical alignment with said predetermined position in an area separate from said reserved area and reading means for reading the reference indicium to provide a signal which in relation to a signal from the transducing means for a reading of the summation indicium indicates the summation of the time-base analog representations generated.

29. Apparatus as in claim 26 wherein the indicium position comparison means comprises a glow discharge device and a scale having a zero marking, the glow discharge device being disposed to move over said scale at said constant velocity during effective record member movement, and to be at said zero marking when the transducing means is initially at said predetermined position, the glow discharge means being coupled to the reading transducing means to receive a summation indicium signal.

30. Apparatus for summing time-base analog representations comprising means for generating said time-base analogs representations in response respectively to signals for beginning said analog representations, the output of the generating means being ending signals of said analog representations respectively, a record member effectively movable in cycles at constant velocity and having reference indicium recorded thereon and further having erasable summation indicium recorded in a separate reserved area initially in electrical alignment with said reference indicium, said electrical alignment indicating zero summation, reading means associated with said record member for reading the reference indicium, transducing means associated with the reserved area for reading, erasing and writing each of the summation indicium successively appearing on said reserved area during movement of the record member relative to the transducing means, erasure means associated with said transducing means for causing erasure of a summation indicium on said reserved area in response to a reading thereof which at the same time produces through said erasure means a beginning signal to cause a succeeding time-base analog representations the ending signal of which is written on the reserved area by said transducing means as a summation indicium, and gated writing means enabled by each of said beginning signals and having an input connected to the electrical measurement receiving and conversion means for receiving said ending signals and further having an output associated with said transducing means for writing summation indicia in said reserved area in response to said ending signals respectively, the distance on the record member effectively moved by the record member between the beginning and ending signals of a time-base analog representations being the corresponding displacement analog representations, the arrangement being such that each time-base analog representations is converted into a displacement analog representations on the reserved area of said record member, said displacement analog representations being contiguous so that the reading of an erasable indicium by said transducing means provides a signal which in reference to a signal derived from the reference indicium indicates the summation of the time-base analog representations generated.

31. Apparatus as in claim 30 further including means to classify a summation indicium comprising a plurality of reading means spaced from each other a predetermined distance along said reserved area on the record member, counter means having a plurality of positions movable from one to the next in response to successive inputs when enabled, and means for enabling said counter means upon a reading of said reference indicium, the outputs of the plurality of reading means on said reserved area being connected together to permit successive inputs therefrom to the counter means, the successive reading of the summation indicium then in said reserved area on the moving record member, respectively, by the remainder of the plurality of reading means past which the summation indicium has not previously moved causes said successive inputs equal in number to said remainder of reading means to move the counter means to one of its positions for indicating the classification of the summation indicium.

32. Apparatus as in claim 31 further including means including said gated writing means for writing the erasable indicium in electrical alignment with said reference indicium after a summation has been classified comprising gating means for passing a signal from the reference indicium reading means to the writing means when enabled by an output from said counter means for indicating that a classification has occurred.

33. Apparatus comprising counting circuit means having a plurality of interconnected stages each with an output, said stages being responsive respectively to successive inputs to provide corresponding successive outputs therefrom and a like plurality of relay-delay means coupled respectively to receive the successive outputs of said stages and operative in response thereto after a predetermined delay, respectively, for an indication of the total number of inputs received by said counting means, the arrangement being such that a succeeding input causes an output from one stage and stops the output from another stage before a predetermined delay allows operation of the relay-delay means associated with said another stage.

34. Apparatus as in claim 33 and further including means for providing on a single line an indication that one of said relay-delay means has operated to indicate the total number of inputs received.

35. Apparatus as in claim 34 wherein the further included means comprises a switch for each of said relay-delay means and operative in conjunction therewith, two lines connecting the switches in parallel, one of said lines extending to form said single line and the other of said lines being connected to a predetermined reference potential.

36. Apparatus comprising counting circuit means having a plurality of stages each including a thyratron coupled at its plate electrode to the plate electrode of the thyratron of the succeeding stage and at its cathode electrode to a first grid electrode of said succeeding stage, means coupling a second grid electrode of each stage except the first stage in parallel to a source of input signals to be counted, means coupling the thyratron of the first stage to a second signal source at a predetermined time to cause an output from the first stage thyratron, a plurality relay relay-delay means coupled respectively to said plate electrodes for receiving the outputs therefrom and operative in response thereto after a predetermined delay time, respectively, for an indication of the total number of input signals, the arrangement being such that starting concurrently with said predetermined time, each of the input signals to be counted, if any, causes a thyratron of one stage to provide an output which extinguishes the thyratron of the next preceeding stage before the output from said next preceeding stage can operate its associated relay-delay means because of the said operating delay time.

37. Apparatus as in claim 36 wherein the means coupling the thyratron of the first stage to a second signal source includes a flip-flop connected at one input to said signal source and at a corresponding output to a grid electrode of the first stage thyratron, the plate electrode of the first stage being connected to the other input of said flip-flop so that the output of the first stage thyratron sets said flip-flop to prevent passage therethrough of a signal from said second source, and wherein the means coupling said second grid electrodes to a source of input signals includes gating means connected to said second signal source and operative to pass said input signals when enabled by a signal from the second signal source.

38. Apparatus for summing time-base analogs comprising means for generating representations of said time-base analogs in response respectively to signals for beginning said analog representations, the output of the generating means being ending signals of the analog representations respectively, a record member effectively movable at constant velocity and having a reference indicium recorded thereon and further having a plurality of areas reserved for the recording thereon of said ending signals respectively, transducing means including associated reading and recording means for each of the reserve record areas, reading means for reading said reference indicium, selector means comprising a plurality of terminals connected in a predetermined manner to the transducing means, an output line and an input line and means permitting the output line and the input line to be connected in a predetermined sequence respectively to predetermined two's of said terminals, the output and input lines being coupled respectively to said generating means for delivery thereto of said beginning signals and receipt therefrom of said ending signals, means for effecting said predetermined sequence for said selector means, the sequences thereof being in response respectively to said ending signals, and summation means connectable with two of said reading means for providing at least a total summation of said time-base analogs.

39. Apparatus as in claim 38 wherein said summation means includes at least one summation selector having a plurality of inputs connected respectively in said predetermined manner to the reading means for the reserved record areas and an output connectable to said inputs individually, the arrangement being such that a signal at said summation selector output with reference to a signal from said reference indicium indicates the sum of the time-base analogs.

40. Apparatus as in claim 38 wherein the summation means includes two summation selectors each having a plurality of inputs connected respectively in said predetermined order to the reading means for the reserved record areas, and each having an output connectable respectively to its inputs individually, the arrangement being such that a signal from each of said summation selector outputs indicates the sum of the included time-base analogs.

41. Apparatus as in claim 38 wherein the means permitting the output line and the input line to be connected in predetermined sequence respectively to predetermined two's of said terminals comprises two annular conductive rings, said terminals being in sets of two for each of said transducing means and disposed adjacent said annular rings respectively, and brush means for each of said annular rings movable therealong respectively so as to contact the ring and an associated terminal when appropriately disposed, the predetermined sequence effecting means causing said brush means to move from one set of terminals to an adjacent set of terminals, said apparatus further including control means for permitting the last recorded ending signal to initiate a beginning signal for the next subsequent time-base analog summation.

42. Apparatus for classifying a variable manifestation according to its magnitude comprising means for generating a beginning command signal, analog means responsive thereto for generating a time-base analog signal proportional to the magnitude of the variable, the analog means including means for producing an ending command signal, means for applying a signal representing the variable manifestation to the analog means for determining the time-occurrence of said ending command signal, a record member, means for moving the record member at a known velocity at least while recording reference indicia, reference transducer means in proximate relation to the member, means for energizing at least a part of the reference transducing means to record indicia on the member in response to at least one of the said command signals, a series of classification reading transducers spaced with respect to an arbitrary reference point along the path of the record member whereat the reference transducer is located, said spacing of the reading transducers being in accordance with predetermined limits of consecutive classes, and circuit means responsive to the ending command signal for producing a signal from at least one of said classification transducers in response to a recorded indicia passing in operative proximity thereto designate the class in which the magnitude falls.

43. Apparatus for classifying a variable manifestation according to its magnitude comprising generating means responsive to a beginning command signal and to a signal representing said manifestation for determining the time occurrence of and generating an ending command signal which in reference to said beginning signal represents an interval timewise proportional to the magnitude of said manifestation, a record member movable at a known velocity, reference transducer means in proximate relation to said member, means for energizing at least a part of the reference transducing means to record an indicium on the record member in response to one of the said command signals, a series of spaced, clasification reading transducers for successively reading the said recorded indicium and respectively spaced from said reference transducer means in accordance with different predetermined limits of consecutive classes, and circuit means coupled to each of said reading transducers for determining which if any of said reading transducers first reads said recorded indicium after a predetermined time following the occurrence of said ending command signal to provide an indication of with which if any of said classes the said manifestation is classifiable.

44. Apparatus as in claim 43 wherein said indicium is recorded by said reference transducer means in response to the said beginning command signal and said circuit means is enabled by said ending signal.

45. Apparatus as in claim 43 wherein the said ending signal is recorded by said reference transducer means as said indicium and said circuit means determines the number of said reading transducers that read said indicium after said predetermined time.

46. Apparatus as in claim 43 wherein the means for energizing the reference transducing means includes means for recording said indicium in response to the ending command signal, and wherein the circuit means includes enabling means responsive to the reading of a recorded signal.

47. Apparatus as in claim 43 wherein the circuit means includes gating means coupled to said classification transducers, means for enabling the gating means in response to the ending command signal, and means closing the gating means in response to a signal generated by the recorded indicia in any one of the classification transducers, whereby a signal is produced from only one of the classification transducers in accordance with the classification of the magnitude.

48. Apparatus as in claim 43 wherein the circuit means comprises gated counter means, the counter gating means being connected to be enabled in response to the generation of a signal in the reference transducer means representative of the beginning command signal, whereby the counter advances one step for each signal generated in the classification transducers intercepted by said recorded indicia, whereby the count after the transversal by the indicia of the last of the class transducers is indicative of the class in which the magnitude falls.

49. Apparatus for classifying a variable according to its magnitude comprising a record member, means for moving the record member at a known velocity at least during recording operations, reference transducer means in proximate relation to the member, a first part of the reference transducer means positioned to sweep out a first path therealong, a second part of the reference transducer means positioned to sweep out a second path therealong, a plurality of classification reading transducers spaced apart with respect to each other and with respect to said reference transducer means in the second path, a reference indicia permanently recorded in said first path, means for generating beginning and ending command signals defining a time-base analog proportional to the magnitude of a variable, means connected with the transducer means in the first path for energizing the reference transducer means in the second path for recording an indicia in the second path in alignment with the pre-recorded indicia in the first path, means responsive to reading the just-mentioned recorded indicia in the second path upon subsequent movement of the indicia past the second path reference transducing means for generating the beginning command signal, means connected with said reference transducing means in the second path for recording the ending command signal, and means responsive to the next following reading of the pre-recorded indicia in the first path by the transducing means operative therein for enabling the classification reading transducers for reading out through at least one of said transducers the recorded indicia in the second path representative of the ending command signal.

50. Apparatus for classifying a variable according to its magnitude and including a plurality of spaced apart classification reading transducers arranged to sweep out the same path and wherein a reference indicia in the path exists, counter means, the counter means having a stepping input, all of the classification reading means connected in common to said counter input, counter gating means, means for enabling the counter gating means at a predetermined time when said reference indicia is between two of said classification transducers, whereby the counter will be stepped according to the remaining number of classification transducers beneath which said reference indicia will pass.

51. Apparatus for summing a series of variable magnitudes comprising a signal generating means for producing an output signal defining the ending point of a time-base analog proportional to a magnitude, said generating means having at least two inputs one of which is adapted to trigger operation of the signal generating means upon receipt of a signal defining the beginning point of the analog and the other of which is adapted to receive said magnitudes, a record member moving at constant velocity, recording and reading transducing means arranged in proximate relationship to said record member, means coupling the reading transducing means to the triggering input of said signal generating means, means coupling the recording transducer means to the signal generating means to record indicia on the record member in response to said output signal, the arrangement being such that the time interval between reading of a selected two of a series of recorded indicia is a time-base analog of all the included magnitudes of the series.

52. Apparatus as in claim 51 wherein the record member bears a pre-recorded indicium the traversal of which by said reading means causes the beginning point signal.

53. Apparatus for classifying variable length time intervals comprising means for generating two signals representative of the instant time interval to be classified, record means movable at a known velocity, means for effectively recording one of said signals on said record means, a series of spaced, classification reading transducers for successively reading the record of the so recorded signal and respectively spaced from said recording means in accordance with predetermined limits of consecutive classes of time intervals, and circuit means coupled to the other of said signals for indicating by which if any of the said reading transducers the said record of the recorded signal is read after the occurrence of said other signal to provide an indication of the one of said classes in which the said instant time interval is classifiable.

54. Apparatus as in claim 53 wherein the first occurring one of said two signals is recorded by said recording means and wherein said circuit means includes gating means coupled to receive the outputs of said classification transducers, means for enabling the gating means in response to the other of said two signals, and means for disabling the gating means in response to an output from said gating means.

55. Apparatus as in claim 53 wherein the one of said two signals which is recorded by said recording means corresponds in time at the time of recordation thereby to the end of said instant time interval, said circuit means including delay means, the other of said two signals being the output of said delay means delaying a first signal which at the time of the said recording of said one signal is related in time to the beginning of the said instant interval, means including counter means commonly coupled to the outputs of said classification transducers and counter gating means enabled by said delay means output for determining the number, if any, of said classification transducers that read the said record of said one signal after said delay means provides its said output.

56. Apparatus for classifying time intervals comprising means for comparing the time occurrence of one signal with the time occurrence of each of a plurality of successive second signals respectively representing maximum predetermined limits of different time intervals and for determining, by providing a respective output, which if any of said second signals occurs first after the occurrence of said one signal, means including delay means having a plurality of transducers for deriving said plurality of successive signals in response to an input signal applied to the delay means at the time of one end of an interval the duration of which is to be classified, said one signal being time related to the other end of said interval, whereby the first of said second signals to occur after said one signal occurs indicates the class in which said interval is classifiable.

57. Apparatus as in claim 56 wherein said delay means includes a record member effectively movable at known velocity, said apparatus further including successive time interval generation and summation means comprising said record member, means for generating a beginning signal and an ending signal for each of the successive intervals to be summed, means for reading recorded indicium on the record member to at least aid in causing said beginning signals, means for recording each of said ending signals on said record member at a point displaced from the recorded indicium which causes its associated beginning signal an amount proportional to the respective time interval, a recorded ending signal for any one interval being at least part of the said recorded indicium for the beginning signal of the next interval, whereby successive intervals cause contiguously successive displacement recordings which in totality represent the sum of the time intervals for which beginning and ending signals were generated, the ending signal of the last of said intervals being said input signal with said one signal being substantially time coincident with the beginning signal of the first of said time intervals, said classifying apparatus including means to effect its operation as aforesaid and classify the time interval representing the summed time intervals.

58. Apparatus for classifying an analog measurement by the duration of a time interval which is proportional thereto in a predetermined manner comprising a function generator responsive to a signal representative of the start time of said interval for generating a continuously changing output signal having a predetermined amplitude versus time characteristic, means responsive to a signal representing, by its amplitude, said analog measurement for providing an ending signal when said output signal attains an amplitude substantially equal to the amplitude of said analog measurement signal for denoting the ending time of said time interval, means including delay means responsive to said start signal for producing a plurality of successive signals representing different maximum limits of successively larger classes of time intervals and respectively corresponding analog measurements, and means coupled to receive said successive signals and including gating means enabled by said ending signal for determining which if any of said successive signals occurs first following enablement of said gating means by said ending signal to indicate the class in which said time interval and its corresponding analog measurement is classifiable.

59. Apparatus as in claim 58 wherein said means including delay means comprises a record track movable at known velocity, means for recording said start signal on said track while it is moving at said velocity, and a plurality of successive reading transducers respectively spaced from said recording means along said track in the direction of movement thereof for said successive signals upon their respective readings of the recorded start signal.

60. Apparatus as in claim 58 wherein said gating means comprises a plurality of gates respectively for said successive signals with each of said gates being substantially simultaneously enabled by said ending signal, there being means coupled to the output of each said gate for disabling all said gates after one of said successive signals passes through its respective gate and before the next of said successive signals is produced.

References Cited in the file of this patent

UNITED STATES PATENTS

| | | |
|---|---|---|
| 2,370,133 | Begun | Feb. 27, 1945 |
| 2,472,542 | Moerman | June 7, 1949 |
| 2,616,965 | Hoeppner | Nov. 4, 1952 |
| 2,641,698 | Gloess et al. | June 9, 1953 |
| 2,680,241 | Gridley | June 1, 1954 |
| 2,690,302 | Nolde | Sept. 28, 1954 |
| 2,703,678 | Hopkins et al. | Mar. 8, 1955 |
| 2,706,078 | Cooper et al. | Apr. 12, 1955 |
| 2,787,416 | Hansen | Apr. 2, 1957 |
| 2,791,288 | Meier | May 7, 1957 |
| 2,791,746 | Bowersox et al. | May 7, 1957 |
| 2,796,596 | Kenosian | June 18, 1957 |
| 2,835,883 | Litchman et al. | May 20, 1958 |
| 2,872,670 | Dickinson | Feb. 3, 1959 |
| 2,876,437 | Johnson | Mar. 3, 1959 |
| 2,907,004 | Chien et al. | Sept. 29, 1959 |

OTHER REFERENCES

Mohanti et al.: "A Simple Electronic Fourier Synthesizer," Journal of Scientific Instruments; vol. 32, No. 11; November 1955; pages 442–444.